Nov. 4, 1952     O. J. MAHA     2,616,449
PILOT OPERATED SOLENOID CONTROLLED VALVE
Filed Dec. 26, 1947     2 SHEETS—SHEET 1

Inventor.
Otto J. Maha.
by Roland C. Rihm
Attorney

Nov. 4, 1952  O. J. MAHA  2,616,449
PILOT OPERATED SOLENOID CONTROLLED VALVE
Filed Dec. 26, 1947  2 SHEETS—SHEET 2

Inventor:
Otto J. Maha,
by Roland e Kehm
Attorney.

Patented Nov. 4, 1952

2,616,449

UNITED STATES PATENT OFFICE 2,616,449

PILOT OPERATED SOLENOID CONTROLLED VALVE

Otto J. Maha, Chicago, Ill., assignor to Hannifin Corporation, Chicago, Ill., a corporation of Illinois Application December 26, 1947, Serial No. 793,850

12 Claims. (Cl. 137—657)

This invention relates to pilot operated solenoid controlled valves, and among other objects aims to provide an improved valve of this type which is reliable in operation and inexpensive to manufacture.

The nature of the invention may be readily understood by reference to one illustrative valve construction embodying the invention and shown in the accompanying drawing. In said drawing.

Figure 1:
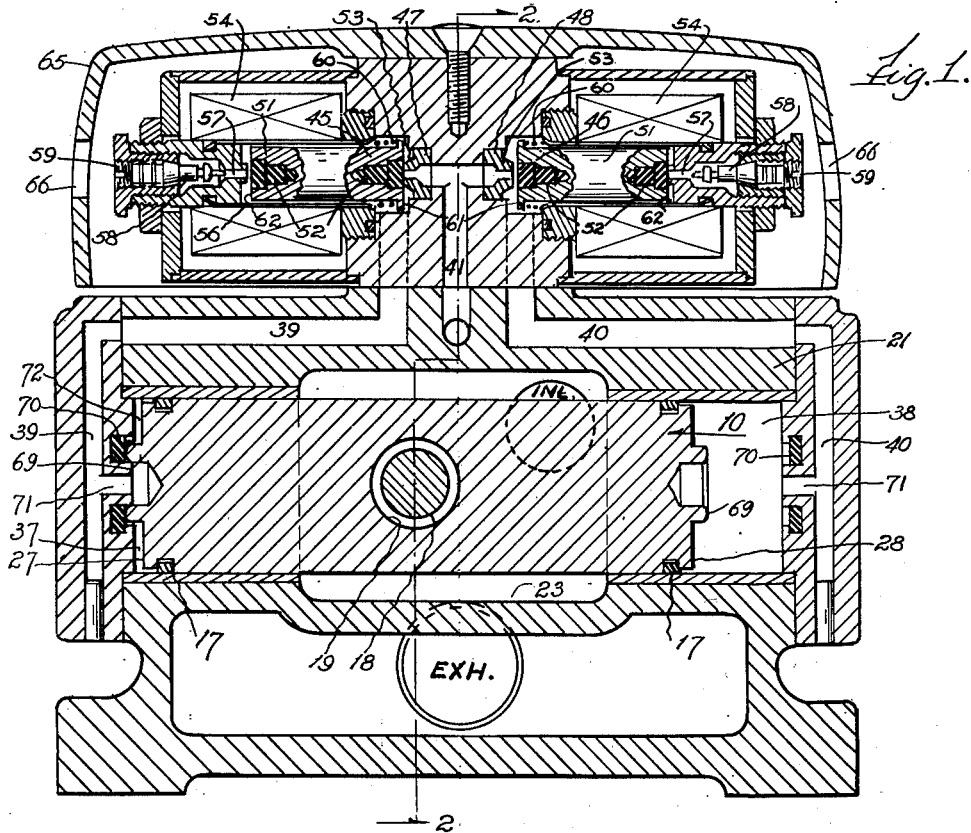
Fig. 1 is a longitudinal section of the valve device taken on the plane 1—1 of Fig. 3.

Whenever the problem of remote control of valves arises, operation by solenoid suggests itself; but as an operating instrumentality a solenoid has serious limitations. It is incapable of exerting substantial force over any substantial distance. Its maximum force is exerted at the end of its stroke (when the core or armature is completely inside the coil) instead of at the beginning of the stroke where, in most cases, the maximum force is required for starting movement. Their inherently quick operation develops high inertia forces both on starting and stopping, resulting in frequent breakage in some portion of the operating mechanism. Such solenoids involve high current consumption and can remain energized only momentarily because of the destructive heat which would otherwise be generated.

The present device is an improvement on pilot operated valves, wherein a small light weight pilot valve is solenoid operated. The solenoid has a very small movement (e. g. less than $\frac{1}{16}$ of an inch) and inertia forces are correspondingly low; it requires low power (e. g. 10 watts or less) for its operation, merely actuating a small pilot valve which in turn controls the operation of the main valve operating element. The latter is in this instance represented by a light weight (e. g. aluminum), normally balanced reciprocating shuttle or piston 10 operatively connected to a valve here shown in the form of a reciprocable, packless slide valve 11. The piston is analogous to a spool shuttle and for convenience will be referred to as a spool although it does not in this instance have a spool shape. Valve is in this instance a four-way valve 11 slidable to connect ports 12 or 13 alternately with pressure fluid and with the exhaust port 14 through the passage 15 inside the valve. Ports 12 and 13 in valve seat 16 are connected and controlled by the valve. The spool is advantageously provided with chromium plated piston rings 17 to minimize operating effort and prevent binding by corrosion. Other non-corrosible materials such as synthetic rubber may be used in the rings.

Figure 3:
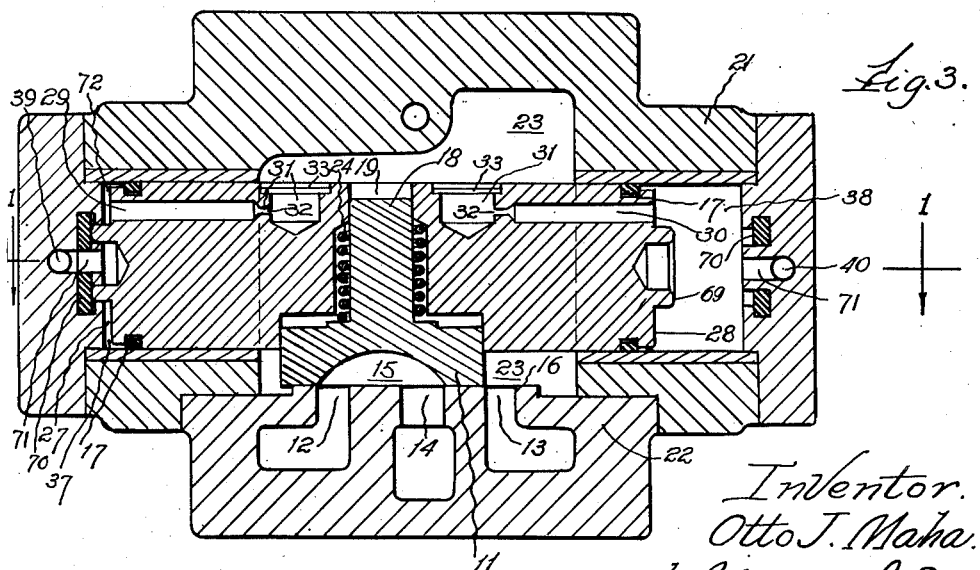
Fig. 3 is a longitudinal section taken on the plane 3—3 of Fig. 2.
Figure 2:
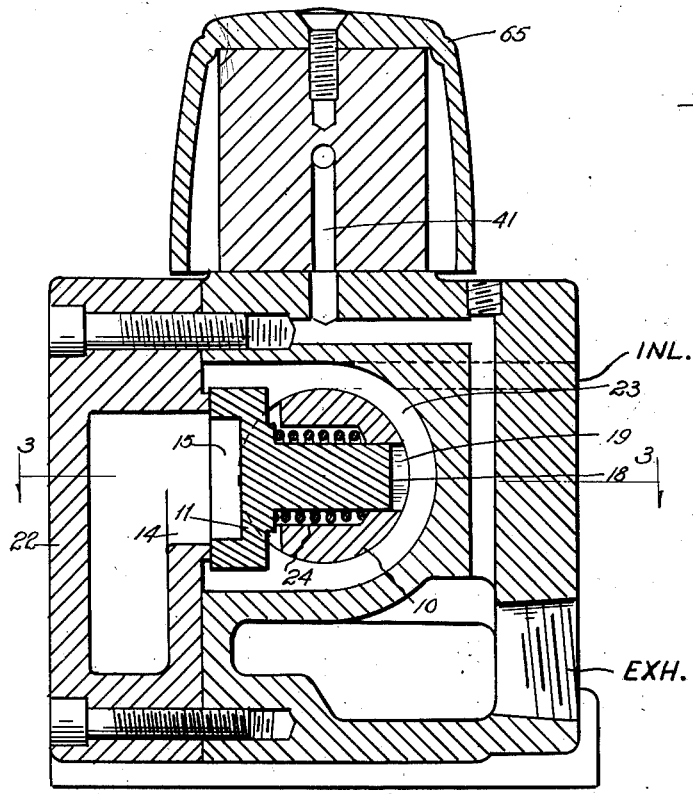
Fig. 2 is a cross section taken on the plane 2—2 of Fig. 1.

The valve is here shown with a cylindrical projection 18 seated inside a recess 19 in this case extending tranversely through the body of spool 10. The valve housing 21 surrounding the spool and connected with the valve seat structure 22 is provided with a circumferential passage 23 open to the spool and connected with the actuating pressure fluid, in this case air pressure. As shown particularly in Figs. 2 and 3, the circumferential passage extends around the spool and communicates with ports 12 and 13 beyond the ends of valve 11. In Fig. 3 the valve is positioned to admit pressure from passage 23 to port 13. Air pressure from passage 23 also bears against the top (in this case the projection 18 and the back surface of the valve) which are exposed to air pressure through the open bore 19, thereby holding the valve tightly against its seat. The light spring 24 functions merely to prevent shifting of the valve in shipment and insures an initial contact with the valve seat when the valve is first subjected to air pressure. The spring is not necessary to maintain the seal of the valve against its seat.

Air pressure is also communicated to the opposite ends 27 and 28 of the spool, in this case through passages 29 and 30 therein which open in ports 31 on the face of the spool. Each of the passages is restricted, in this case by forming a restricted orifice 32 in the passage so as substantially to restrict the rate of flow of air pressure into the opposite ends of the valve housing beyond the spool. Filter screens 33 are inserted in orifices 31 to prevent particles of solid matter from lodging in and clogging the restricted passages 32 which in the present instance are of the order of $\frac{3}{32}$ of an inch in diameter.

Spaces 37 and 38 beyond the ends of the spool are adapted to be selectively connected through passages 39 and 40 respectively, with exhaust passage 41 as presently described. Passages 39 and 40 open in ports at the respective ends of the spool cylinder (Fig. 1). The exhaust passage is substantially larger than the restricted portions 32 of passages 29 and 30, thus making it possible to exhaust pressure fluid from spaces 37 and 38 respectively at a rate faster than the fluid can flow into such spaces through the restricted orifices 32. Thus by exhausting one end of the spool cylinder, air pressure existing at the opposite end is sufficiently greater than that at the exhausted end to move the spool toward the exhausted end and with it the valve 11. Movement of the spool is elastically cushioned at each end of the stroke by the air remaining in that end of the cylinder. Being characterized by light weight and low friction, the velocity of the spool is very high yet shock is wholly absent.

Exhaust passages 39 and 40 are respectively controlled by solenoid operated pilot valves 45 and 46. As here shown these valves control ports 47 and 48 respectively opening from passages 39 and 40 into the common exhaust passage 41. The port diameters are substantially greater than that at the restricted orifices 32 (being in this instance of the order of $5/64$ of an inch) thereby insuring exhaust from the respective spool cylinder ends 37 and 38 at a rate greater than pressure fluid can flow into such spaces through orifices 32. The pressure drop ensuing as a result of the opening of one of the pilot valve orifices is sufficient to overbalance the spool valve, and as stated above to cause the spool to move in the direction of the exhausted end.

The illustrative solenoid operated pilot valves comprise in this instance a solenoid core or armature 51, carrying at its end an insert 52 of hard rubber or the like adapted to bear against the valve seats 53 respectively to close the ports. The surrounding solenoid coil 54, when energized, draws the core 51 away from the valve seat to open the desired port. The movement necessary for this purpose is very small being of the order of $1/16$ of an inch. Such movement can be effected by a small solenoid requiring only about 10 watts for its operation. When de-energized, the light spring 60 returns the core to its initial position.

The illustrative solenoid is advantageously provided with the means for operating the pilot valves in the event of current failure or for manually synchronizing the operation of the solenoid with a predetermined cycle of operations. As here shown the solenoid core is loosely surrounded by a cylinder 56 so that air pressure may reach the opposite end of the core, incidentally assisting in holding the valve on its seat. At such end is an orifice 57 closed by the solenoid when energized. Such orifice is also closed by a manually operable valve 58, in this case in the form of a small tire valve, which may be manually opened by depressing the stem 59 of the valve. When thus opened pressure at the end of the core exhausts sufficiently to permit opening movement of the core under the unbalanced pressure which then exists at the end 61 of the core. Leakage of pressure between cylinder 56 and the solenoid core is insufficient to maintain a balanced pressure at the opposite end 62 of the core when valve 58 is open. In other words, exhaust through valve 58 is at a greater rate than leakage can occur induced by the drop in pressure which ensures opening of the valve.

Cover 65 over the solenoid pilot valves is provided with holes 66 through which valves 58 may be operated.

In the form of valve illustrated in Fig. 1 the respective solenoids are identical and operate identically, though controlled by independent circuits. Thus valve 11 may be shifted or operated at will simply by closing the appropriate solenoid circuit. These circuits may be either manually closed or in the case of apparatus involving an automatically repeated cycle, the circuits may be controlled automatically by appropriate controlling means which close and open the circuits at the appropriate phases in the cycle. Closing of the circuit need only be momentary but no harm would be done if the solenoids remained energized indefinitely since they consume so little power that it is impossible to overheat them.

The respective ends of the spool are provided with means for preventing indefinite leakage and loss of pressure fluid through orifices 32. Such means are here represented by a valve in the form of an annular rib 69 adapted to seat on a valve seat 70 surrounding cylinder orifice 71 in the respective exhaust lines 39 and 40. Thus pressure fluid may exhaust from an end of the spool cylinder only momentarily and until the spool reaches the end of the cylinder and seats against the valve seat 70. The area sealed out by seat 70 advantageously slightly unbalances the spool to insure its being held against displacement by vibration or other external forces. Preferably the annular ribs 69 are made sufficiently high to provide a space 72 at the ends of the spools for access of pressure fluid to actuate the spool in the reverse direction. When thus seated pressure again builds up at the lately exhausted end of the spool cylinder for actuating the spool if and when its opposite end be exhausted.

Figure 4:
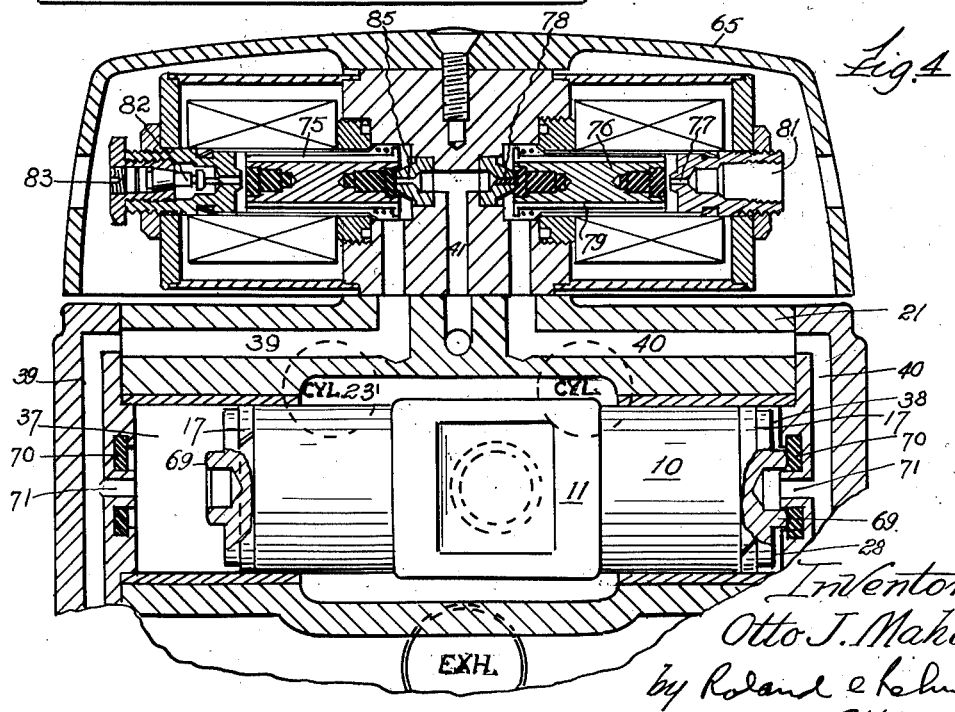
Fig. 4 is a fragmentary section similar to that of Fig. 1 showing a different pilot valve operating arrangement.

In Fig. 4 is illustrated a different control arrangement suitable for valves operating in a cycle wherein the valve is returned to initial position automatically upon de-energization of the pilot valve solenoid. As here shown the respective solenoids 75 and 76 are connected in parallel and simultaneously energized. Solenoid 76 in this instance controls only a single port 77; that at its other end being plugged as at 78. Line 40 exhausts through the passage 79 along the exterior of the solenoid core through port 77 to exhaust passage 81. Port 77 and passage 40 being normally open, spool 10 is normally positioned at that end of its cylinder. Solenoid 75 operates similarly to solenoid 51, opening orifice 85 when energized, thereby connecting passage 39 with exhaust line 41. When the solenoids are simultaneously energized exhaust through line 40 is closed and that through line 39 and port 85 opened, thereby resulting in a shifting of the spool to the opposite end of its cylinder. It should be understood that during the periods when port 77 is open to exhaust, the rib 69 on the end of the spool is against its seat 70 thus preventing continuous escape of pressure fluid through orifice 32. Even though pressure again builds up at the lately exhausted end of the cylinder, no movement of the spool takes place until it is again unbalanced by opening of the opposite pilot exhaust port.

When solenoids 75 and 76 are de-energized (simultaneously) port 77 and passage 40 are again opened to exhaust and the spool is returned to its initial position where it remains until the solenoids are again energized.

For manual operation as described in connection with the device of Fig. 1, valve 82 (in this case similar to valve 58) is opened by depressing valve stem 83 and port 81 is closed by holding one's finger over it. Upon release of valve stem 82 and opening of port 81, the valve will return to its normal or initial position.

The illustrative devices thus incorporates the advantages of remote control obtainable by solenoid operation, without any of the disadvantages heretofore inherent in the use of solenoids. In addition the invention makes possible a compact operating unit which occupies much less space than prior remotely controlled devices and which because of its regular shape and compactness, harmonizes with the apparatus to which it is added.

Obviously the invention is not limited to the details of the illustrative devices since these may be variously modified. Moreover it is not indispensable that all features of the invention be used conjointly since various features may be used to advantage in different combinations and subcombinations.

Having described my invention, I claim:

1. A solenoid controlled valve of the character described comprising in combination a main valve in the form of a packless slide valve having an elevated self-cleaning seat, a lightweight reciprocable free piston, a valve chamber for said slide valve including a cylinder for said piston and having a pressure fluid connection to admit pressure fluid to said main valve and piston, low friction sealing means for said piston, means for connecting said piston to said slide valve for operating the latter, said chamber having a pressure fluid passage around and communicating with said piston and adapted to communicate with said slide valve, passages in said piston communicating with the ends of said cylinder beyond the ends of said piston and connected with the first named passage for conducting pressure fluid to said cylinder ends, the latter passages having restrictions on the order of $\frac{1}{32}$ of an inch in diameter to limit the rate of flow of pressure fluid into said cylinder ends, screens in said piston excluding dirt from said passages, exhaust passages leading from the respective cylinder ends and being larger than said restricted passages to permit exhaust from said cylinder ends at a rate greater than flow of pressure fluid thereinto, low power solenoids and solenoid actuated lightweight armatures including poppet valves at their ends controlling the respective exhaust passages and adapted to open an end of said cylinder to exhaust, thereby to unbalance said piston to cause it to be shifted to the exhausted end of said cylinder, said solenoids and armatures each having a small operating movement of the order of $\frac{1}{16}$ of an inch.

2. A valve device of the character described comprising in combination a valve housing including a cylinder, an operating spool therein, a packless slide valve operatively connected to said spool intermediate to its ends, said cylinder having a passage around said spool intermediate its ends and communicating with the ends of said slide valve for conveying pressure fluid thereto, said spool having passages therein communicating with said first named passage and adapted to conduct pressure fluid to said cylinder ends beyond the ends of the spool, said spool passages each having a restriction on the order of $\frac{1}{32}$ of an inch in diameter to limit the rate of flow of pressure fluid into said cylinder ends, screens in said piston for said passages, exhaust ports having exhaust passages leading from said cylinder ends and being of a size to exhaust said cylinder ends at a rate greater than flow of pressure fluid thereinto, small low power solenoids each having a lightweight armature embodying a pilot valve at its end controlling the respective exhaust ports, said solenoid valves having a small movement of the order of $\frac{1}{16}$ of an inch, and means for operating said pilot valves to open an exhaust port to exhaust an end of said cylinder.

3. A valve device of the character described comprising in combination a valve housing including a cylinder, a lightweight reciprocable spool slidable in said cylinder, a packless slide valve in said housing operatively connected to said spool intermediate its ends, a valve seat over which said valve is adapted to slide and having therein inlet and exhaust ports, said inlet ports being adapted to be uncovered by said valve, said housing having a pressure fluid inlet and pressure fluid passages around and communicating with said spool and communicating with the exterior of said valve and with said valve seat beyond the ends of said valve, passages in said spool communicating with the ends of said cylinder beyond the ends of said pool and connected with the first named passage for conducting pressure fluid to said cylinder ends, said latter passages being restricted to limit the rate of flow of pressure fluid into said cylinder ends, exhaust passages leading from the respective cylinder ends and being larger than said restricted passages to permit exhaust from said cylinder ends at a rate greater than flow of pressure fluid thereinto, a low power solenoid, a lightweight reciprocable solenoid armature embodying a pilot valve at its end closing an exhaust passage and being adapted when energized to open said exhaust passage, said pilot valve being light in weight and having a small movement of the order of $\frac{1}{16}$ of an inch, and means for operating said pilot valve to unbalance said spool by exhausting the pressure at one end thereof to cause movement of the spool to the exhausted end, said spool having at each end valve means for engaging said cylinder and closing its exhaust passage upon reaching the end of the cylinder to prevent further escape of pressure fluid through the open exhaust passage and establish a fixed terminal position for said spool.

4. A valve device of the character described comprising in combination a valve housing including a cylinder, a lightweight free reciprocable spool in said cylinder, a packless slide valve in said housing operatively connected to said spool intermediate its ends, a valve seat over which said valve is adapted to slide and having therein inlet and exhaust ports, said inlet ports being adapted to be uncovered by said valve, said housing having a pressure fluid inlet and pressure fluid passages around and communicating with said spool and communicating with said valve seat beyond the ends of said valve, passages in said spol communicating with the ends of said cylinder beyond the ends of said spool and connected with the first named passage for conducting pressure fluid to said cylinder ends, said latter passages being restricted to limit the rate of flow of pressure fluid into said cylinder ends, exhaust passages leading from their respective cylinder ends and being larger than said restricted passages to permit exhaust from said cylinder ends at a rate greater than flow of pressure fluid thereinto, a low power solenoid, a solenoid controlled reciprocable armature carrying a pilot valve controlling an exhaust passage and being adapted when energized to open said exhaust passage, said pilot valve being light in weight and having a small movement of the order of $\frac{1}{16}$ of an inch, and means for operating said pilot valve to unbalance said spool by exhausting the pressure at one end thereof to cause movement of the spool to the exhausted end, said spool having at each end valve means for closing its exhaust passage upon reaching the end of the cylinder to prevent further escape of pressure fluid through the open exhaust passage, said pilot valve having manually operated valve means for manually opening said exhaust passage to exhaust independently of operation of the solenoid.

5. A valve device of the character described comprising in combination a valve housing including a cylinder, a lightweight reciprocable spool in said cylinder, a slide valve in said housing operatively connected to said spool intermediate its ends, an elevated valve seat over which said valve is adapted to slide and having therein inlet and exhaust ports, said inlet ports being adapted to be uncovered by said valve, said housing having a pressure fluid inlet and having pressure fluid passages around and communicating with said spool and communicating with said valve seat beyond the ends of said valve, passages in said spool communicating with the ends of said cylinder beyond the ends of said spool and connected with the first named passage for conducting pressure fluid to said cylinder ends, said latter passages being restricted to limit the rate of flow of pressure fluid into said cylinder ends, screens in said piston for said passages, exhaust passages leading from the respective cylinder ends and being larger than said restricted passages to permit exhaust from said cylinder ends at a rate greater than flow of pressure fluid thereinto, exhaust ports for the respective exhaust passages, a lightweight low power solenoid controlled pilot valve normally closing one of said ports and adapted when energized to open its port to exhaust, said pilot valve comprising a light reciprocable armature core and a cylinder loosely surrounding the same and connected with an exhaust passage, whereby the pressure normally existing in said exhaust passage tends to hold said valve in closed position, and means for energizing said solenoid valve for connecting an end of said spool cylinder to exhaust to cause said spool to move to the exhausted end.

6. In a valve device of the character described the combination comprising a valve housing including a cylinder, a free valve operating piston reciprocable in said cylinder, conduit means for conducting pressure fluid to each end of said cylinder, exhaust passages communicating with the respective ends of said cylinder, control means for said passages for selectively exhausting the ends of said cylinder to cause said piston to move toward the exhausted cylinder end, and valve means projecting at each end of the piston positively limiting movement of said piston and to close the exhaust passage to prevent further escape of pressure through said exhaust passage.

7. In a valve device of the character described the combination comprising a valve housing including a cylinder, a free valve operating piston reciprocable in said cylinder, conduit means for conducting pressure fluid to each end of said cylinder, exhaust ports at each end of the cylinder, controls for said ports for selectively exhausting the ends of said cylinder to cause said piston to move toward the exhausted end, and valve means projecting from each end of said piston for closing the port at the exhausted end of said cylinder when said piston reaches said end and for spacing the end of the piston from said cylinder end to permit access of pressure to said piston end thereby to provide force for moving the piston in the opposite direction upon exhausting of the opposite end of the cylinder.

8. In a valve device of the character described the combination comprising a valve housing including a cylinder, a free valve operating piston reciprocable in said cylinder, conduit means for conducting pressure fluid to each end of said cylinder, exhaust passages communicating with the respective ends of said cylinder, control means for said passages for selectively exhausting the ends of said cylinder to cause said piston to move toward the exhausted cylinder end, and resilient valve means including a valve and valve seat for closing the exhaust passage when the piston reaches the exhausted end of said cylinder and adapted to cushion the movement of the piston.

9. In a valve device of the character described the combination comprising a valve housing including a cylinder, a free valve operating piston reciprocable in said cylinder, conduits for conducting air pressure to each end of said cylinder, exhaust ports at each end of the cylinder, controls for said ports for selectively exhausting the ends of said cylinder to cause said piston to move toward the exhausted end, valve means projecting from each end of said piston for closing the port at the exhausted end of said cylinder when said piston reaches said end and for spacing the end of the piston from the end of the cylinder thereby to provide space to trap a volume of air to cushion the movement of said piston.

10. In a valve device of the character described the combination comprising a valve housing including a cylinder, a free valve operating piston reciprocable in said cylinder, conduit means for conducting pressure fluid to each end of said cylinder, exhaust ports at each end of the cylinder, controls for said ports for selectively exhausting the ends of said cylinder to cause said piston to move toward the exhausted end, and valve means projecting from each end of said piston for closing the port at the exhausted end of said cylinder when said piston reaches said end and for spacing the end of the piston from said cylinder end to permit access of pressure to said piston end, the area of the piston end exposed to said pressure and excluding the area enclosed by said valve means being less than the area of the opposite end of said piston exposed to said pressure thereby to create a differential of force to hold said piston at the exhausted end of said cylinder.

11. In a pilot operated solenoid controlled valve the combination comprising a pair of low power solenoid operated pilot valves having exhaust ports adapted to be connected to the respective ends of a cylinder for operating a valve actuating piston therein by controlling the exhaust from the respective ends of the cylinder, one of said pilot valves comprising a valve housing including a solenoid core having an armature bore therein, a poppet valve seat and exhaust port at one end of said bore, a cylindrical armature core slidable in said bore and carrying a poppet valve movable by said armature toward and away from said seat, an exhaust passage leading from an end of said cylinder to an intermediate part of said bore, a second valve seat and exhaust port at the other end of the solenoid bore, a manually openable exhaust valve biased toward and normally closing said second seat, there being sufficient clearance between said armature and its bore to permit fluid from said exhaust passage to reach both said poppet valve and said manually operated valve, whereby the valve operating piston may be manually actuated when desired without energizing said solenoid by opening said manually operated exhaust valve.

12. In a pilot operated valve wherein a balanced valve operating piston is moved toward the respective ends of a cylinder by exhausting air pressure at such ends, the combination comprising a pair of low power solenoid operated pilot poppet valves, a housing for said poppet valves having valve seats and exhaust passages leading from said seats and adapted to be connected respectively with the ends of the piston cylinder, said seats opening to exhaust ports in said housing, solenoid coils having armature bores therein, armature cores slidable in said bores and carrying the respective poppet valves, one of said seats being arranged in said housing so that its exhaust port is closed when its armature is energized and the other so that its port is open when its armature is energized, means normally holding one of said armatures in exhaust port closing position, means normally holding the other armature in such position that its exhaust port is open, said solenoid coils being connected in parallel so as to be simultaneously energized upon closing and opening of the solenoid circuit, whereby the valve operating piston is moved to one end of its cylinder on closing said circuit and to the other end upon opening the circuit.

OTTO J. MAHA.

REFERENCES CITED

The following references are of record in the file of this patent:

UNITED STATES PATENTS

| Number | Name | Date |
|---|---|---|
| 50,218 | Cameron | Oct. 3, 1865 |
| 358,713 | Westinghouse | Mar. 1, 1887 |
| 396,239 | Schreuder | Jan. 15, 1889 |
| 446,406 | Greenwood | Feb. 10, 1891 |
| 485,046 | Laney | Oct. 25, 1892 |
| 1,791,613 | Clay | Feb. 10, 1931 |
| 1,908,504 | Bone | May 9, 1933 |
| 2,110,702 | Farmer | Mar. 8, 1938 |
| 2,409,517 | Schmidt | Oct. 15, 1946 |

FOREIGN PATENTS

| Number | Country | Date |
|---|---|---|
| 71,248 | Switzerland | June 15, 1915 |
| 586,501 | Great Britain | Mar. 20, 1947 |
| 853,822 | France | Mar. 29, 1940 |